June 27, 1939.  J. C. BROWN  2,164,050
RAZOR BLADE HOLDER
Filed Nov. 13, 1935
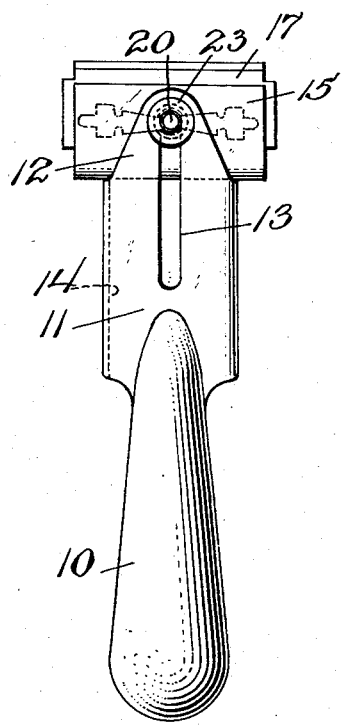
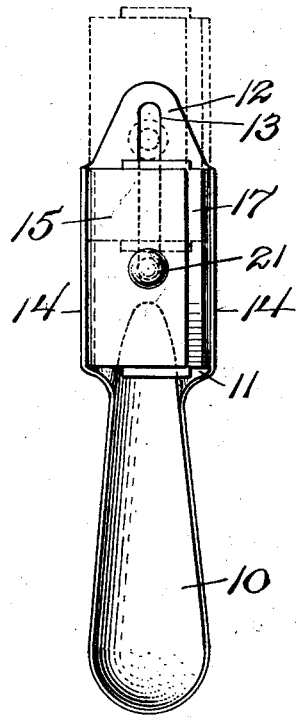
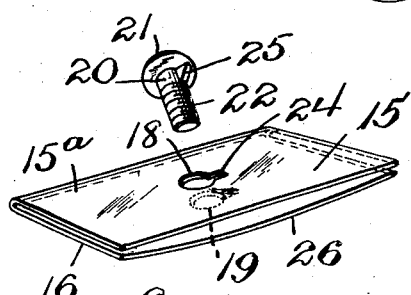
INVENTOR
John Clark Brown,
BY
Wm H Caufield,
ATTORNEY Patented June 27, 1939

2,164,050

UNITED STATES PATENT OFFICE 2,164,050

RAZOR BLADE HOLDER

John Clark Brown, New York, N. Y.

Application November 13, 1935, Serial No. 49,489

2 Claims. (Cl. 30—320)

This invention relates to an improved razor blade holder to enable the blade to be used transversely of the handle part for scraping purposes or for chopping purposes in the kitchen in mincing vegetables and the like, to enable the blade to be used longitudinally of the handle for use as a knife for cutting or for ripping seams, and to enable the housing of the blade when not in use in order to protect the edge of the blade.

The invention also provides an adjustment for the various positions of the blade and for adjusting the blade to extend the desired length when used longitudinally of the handle as a knife or ripper.

The invention is designed for the reception of double edge blades in which one edge is always protected thus enabling one edge to be kept sharp while the first edge is being used.

The invention relates, further, to various details of construction which will be hereinafter more fully described and finally embodied in the claims.

The invention is illustrated in the accompanying drawing. Figure 1 is a rear view of the razor blade holder with the blade arranged transversely. Figure 2 is a front view of the holder with the blade housed and showing the blade by dotted lines in its extended position. Figure 3 is a perspective view of the blade clip and stud used in conjunction therewith.

The main part of the razor blade holder consists of a sheet metal handle 10, slightly dished to stiffen it, a flat extension 11 on the end of the handle, and a lip 12 projecting beyond the extension 11. The extension and lip are provided with a longitudinally arranged slot 13 which preferably terminates short of the end of the lip 12. The sides of the extension 11 are provided with flanges 14 extending a slight distance above the surface of the extension and both extending to the same side giving the extension the form of a flat shallow trough.

A clip 15 is formed of thin sheet metal to lie against the front face of the extension, the clip being provided with a return bend to form two lips 15ᵃ and 16. The clip 15 receives a double edged razor blade shown at 17 and is narrower than the blade, allowing one cutting edge of the blade to project. The two lips of the clip are provided with perforations 18 and 19 at a point where they register with the slot in a razor blade in the clip A headed stud 20 with the head 21 fits into the perforations 18 and 19 and through the slot 13 and has a thread 22 on the shank. A hand nut 23 is screwed onto the threaded stud 20. In order to facilitate the assembly of the parts and hold the stud against turning when turning the nut 23 at least one opening, for instance the opening 18, is provided with a slot 24 and the stud has a key 25 fitting the slot 24.

In Figure 2 the clip and the blade are shown in housed position, protected by the flanges 14. When the blade is to be used as a knife or ripper the nut 23 is slightly relieved, the clip and blade with the stud and nut are slid out the desired distance and the edge of the blade is available for use and the nut is tightened. The blade and clip are braced by the stiffer lip 12.

When the blade is to be used in position transverse to the hande, as a scraper or chopper, the nut 23 is relieved sufficiently to allow the clip to clear the flanges 14 and clip arranged across the lip. The parts are so proportioned that the outer end of the slot 13 is extended to allow the back edge of the clip to rest against the ends of the flanges 14, as shown in Figure 1. The nut is then tightened and the clip and blade are held braced by the lip 12 and held against retreating by the outer ends of the flanges 14.

When the blade is to be housed, the nut is released, the clip and blade swung around and again housed between the flanges 14.

In the light form of holder shown the blade requires stiff support near its ends. For this purpose at least one of the walls of the clip 15, as the wall 16 is bent outwardly at the centre as shown at 26. When the two walls are clamped against the blade, the corners of the walls do not bend outwardly and the walls 15 and 16 are held flat against the blade for nearly its entire length giving the blade rigidity for use, as only a small part of the blade extends beyond the clip.

Various changes can be made in the form and proportion of parts without departing from the scope of my invention.

The free edges of the clip, that is, both the edge 26 and the edge opposed thereto can be bent slightly toward each other to lend stiffness to the device and to increase the tension of the clip on the blade when it is clamped thereon.

I claim:

1. A razor blade holder comprising a sheet metal handle having an extension with a longitudinal slot therein, the extension having flanges at its sides terminating short of the end of the slot, a clip of sheet metal bent into a return bend and forming a channel for a razor blade, a stud passing through the slot and through the clip, and a nut on the end of the stud, the distance from the outer end of the slot to the outer end of the flanges being as great as the distance from the stud to the bent edge of the clip whereby the flanges act to brace the clip when the clip is arranged transversely.

2. A razor blade holder as set forth in claim 1 and characterized by the free ends of the clip being closer together at the edges of the clip than in the centre.

JOHN CLARK BROWN.